(12) United States Patent
Kogai et al.

(10) Patent No.: US 9,896,782 B2
(45) Date of Patent: Feb. 20, 2018

(54) METHOD FOR PRODUCING POROUS CALCIUM PHOSPHATE BODY

(71) Applicants: JNC CORPORATION, Tokyo (JP); SofSera Corporation, Tokyo (JP)

(72) Inventors: Yasumichi Kogai, Tokyo (JP); Daisuke Nomi, Tokyo (JP); Hisashi Hattori, Tokyo (JP); Karl Kazushige Kawabe, Tokyo (JP); You Umebayashi, Shiga (JP); Yukinori Kataoka, Shiga (JP); Minoru Miyauchi, Shiga (JP)

(73) Assignees: JNC CORPORATION, Tokyo (JP); SofSera Corporation, Tokyo (JP)

( * ) Notice: Subject to any disclaimer, the term of this patent is extended or adjusted under 35 U.S.C. 154(b) by 65 days.

(21) Appl. No.: 14/409,475

(22) PCT Filed: Jun. 19, 2013

(86) PCT No.: PCT/JP2013/066883
§ 371 (c)(1),
(2) Date: Dec. 19, 2014

(87) PCT Pub. No.: WO2013/191221
PCT Pub. Date: Dec. 27, 2013

(65) Prior Publication Data
US 2015/0152573 A1 Jun. 4, 2015

(30) Foreign Application Priority Data

Jun. 20, 2012 (JP) .................................. 2012-139147
Oct. 11, 2012 (JP) .................................. 2012-226291

(51) Int. Cl.
*D01F 9/08* (2006.01)
*D01D 5/00* (2006.01)
*C01B 25/32* (2006.01)

(52) U.S. Cl.
CPC ............... *D01F 9/08* (2013.01); *C01B 25/32* (2013.01); *C01B 25/321* (2013.01); *D01D 5/003* (2013.01); *D01D 5/0007* (2013.01); *D01D 5/0015* (2013.01); *D01D 5/0023* (2013.01); *D01D 5/0038* (2013.01); *D01D 5/0046* (2013.01); *D10B 2101/10* (2013.01)

(58) Field of Classification Search
CPC .... D01D 5/0015; D01D 5/0023; D01D 5/003; D01D 5/0038; D01D 5/0046
USPC ........................... 264/10, 464, 465, 466, 484
See application file for complete search history.

(56) References Cited

U.S. PATENT DOCUMENTS

| | | | |
|---|---|---|---|
| 4,659,617 A | 4/1987 | Fujii et al. | |
| 2009/0028921 A1* | 1/2009 | Arinzeh | D01D 5/0007 264/484 X |
| 2009/0317446 A1* | 12/2009 | Tan | D01D 5/0038 424/423 |
| 2011/0022181 A1* | 1/2011 | Kasahara | A61L 27/14 623/23.5 |
| 2015/0087062 A1* | 3/2015 | Arinzeh | A61L 27/26 435/396 |
| 2015/0283298 A1* | 10/2015 | Kaplan | A61L 27/12 424/93.7 |

FOREIGN PATENT DOCUMENTS

| | | |
|---|---|---|
| CN | 1456360 | 11/2003 |
| CN | 101376567 | 3/2009 |
| CN | 101822852 | 9/2010 |
| CN | 102102242 | 6/2011 |
| EP | 0174827 | 3/1986 |
| JP | 02-167868 | 6/1990 |
| JP | 5-85666 | 12/1993 |
| JP | H7-34329 | 2/1995 |
| JP | 2004-049355 | 2/2004 |
| JP | 2007-246299 | 9/2007 |
| JP | 4265946 | 5/2009 |
| JP | 2010-189798 | 9/2010 |

OTHER PUBLICATIONS

"Search Report of European Counterpart Application", dated Jan. 26, 2016, p. 1-p. 11.
Dai et al., "Electrospinning of hydroxyapatite fibrous mats", Materials Letters, Apr. 21, 2007, pp. 2735-2738, vol. 61, No.13, North Holland Publishing Company, Amsterdam, NL.
Satya Shivkumar et al., "Production of Novel Architectures Through Controlled Degradation of Electrospun Precursors", Advanced Processing and Manufacturing Technologies for Structural and Multifunctional Materials III, published online on Jan. 2010, pp. 145-156, vol. 30, No. 8, The American Ceramic Society, USA.
Peng et al, "Hydroxyapatite needle-shaped particles/poly(L-lactic acid) electrospum scaffolds with perfect particle-along-nanofiber orientation and significantly enhanced mechanical properties", The Journal of Physical Chemistry, Aug. 18, 2011, pp. 15743-15751, vol. 115E, No. 32, American Chemical Society, USA.
Rodriguez G N P et al., "Electrospum scaffolds composed of Poly(L-lactic acid) and hydroxyapatite", Key Engineering Materials, Nov. 6, 2011, pp. 872-877, vol. 493-494, Trans Tech Publications LTD CHE.
Phipps M C et al., "Increasing the pore sizes of bone-mimetic electrospun scaffolds comprised of polycaprolactone, caollagen I and hydroxyapatite to enhance cell infiltration", Biomaterials, Jan. 2012, vol. 33, No. 2, pp. 524-534, Elsevier.
"Office Action of China Counterpart Application" with English translation, dated Jun. 15, 2016, p. 1-p. 6.
"Office Action of China Counterpart Application", issued on Nov. 3, 2015, pp. 1-17, with English translation thereof.

(Continued)

*Primary Examiner* — Leo B Tentoni
(74) *Attorney, Agent, or Firm* — JCIPRNET

(57) ABSTRACT

To provide a method for producing a porous calcium phosphate body having open micro-pores, by the method for producing the porous calcium phosphate body, in which calcium phosphate is subjected to electro-spinning.

19 Claims, 6 Drawing Sheets

(56) References Cited

OTHER PUBLICATIONS

"International Search Report (Form PCT/ISA/210)", dated Aug. 20, 2013, with English translation thereof, p. 1-p. 4.
"Office Action of China Counterpart Application" with English translation thereof, dated Nov. 4, 2016, p. 1-p. 13.
"Second Office Action of Australia Counterpart Application", dated Jan. 25, 2017, p. 1-p. 4.
"Office Action of China Counterpart Application" with English translation thereof, dated Feb. 22, 2017, p. 1-p. 13.
"Office Action of China Counterpart Application," with English translation thereof, dated Jun. 1, 2017, p. 1-p. 13.
"Office Action of China Counterpart Application," dated Sep. 5, 2017, with English translation thereof, p. 1-p. 16.

* cited by examiner

METHOD FOR PRODUCING POROUS CALCIUM PHOSPHATE BODY

CROSS-REFERENCE TO RELATED APPLICATION

This application is a 371 application of an international PCT application serial no. PCT/JP2013/066883, filed on Jun. 19, 2013, which claims the priority benefit of Japan application serial no. 2012-139147, filed on Jun. 20, 2012, and Japan application serial no. 2012-226291, filed on Oct. 11, 2012. The entirety of each of the above-mentioned patent applications is hereby incorporated by reference herein and made a part of this specification.

TECHNICAL FIELD

The present invention relates to a method for producing a porous calcium phosphate body, and the porous calcium phosphate body produced thereby.

BACKGROUND ART

Hydroxyapatite being one kind of calcium phosphate is ceramics as a major constituent of a tooth or bone, and has excellent biocompatibility, protein adsorption characteristics, catalytic activity or the like, and therefore is used as a biomaterial such as an artificial bone and a bone prosthetic material, a packing material for chromatography or a catalyst for synthesizing polymer alcohol or the like. In particular, from viewpoints of biocompatibility, adsorption characteristics, reaction characteristics or the like, a porous hydroxyapatite material is further suited therefor. For example, when hydroxyapatite is used as the biomaterial, hydroxyapatite is made porous to allow a biotissue to penetrate into pores to facilitate bonding with the biotissue. Moreover, when hydroxyapatite is used as the packing material for chromatography or the catalyst, hydroxyapatite is made porous to allow an increase in a specific surface area to improve separation characteristics and the reaction characteristics.

Then, in order to produce a porous hydroxyapatite body, a proposal has been made on drying and calcining the resulting gel in a state in which the bubble are hold (see Patent literature No. 1, for example) by a method of stirring slurry of hydroxyapatite and a water-soluble polymer to bubble the slurry, and gelating the bubbled slurry by heating.

However, for example, in order to allow circulation in a blood flow to form a neonatal bone into an inside when the thus obtained porous body is used as the artificial bone, or in order to facilitate passage of a sample to improve a filtration rate when the obtained porous body is used as the packing material for chromatography, foam formed within hydroxyapatite needs to be open. However, the method of obtaining the porous body using the foam included in the slurry has problems of causing no sufficient mutual connection of the foam formed in the slurry to be high in a ratio at which the foam is formed as closed pores in the porous body, and low in a ratio at which open pores are formed. Moreover, control of the foam is difficult, and therefore the method has a problem of difficulty in controlling a uniform pore size and void ratio.

Moreover, a method is also known in which slurry of ceramics such as hydroxyapatite is impregnated into a porous organic body such as a sponge to dry and calcine the porous organic body into which the slurry is impregnated. According to the publicly known method, a ceramics porous body having a high ratio of open pores and a high void ratio can be produced (see Patent literature No. 2, for example).

However, porosity of the ceramics is specified by porosity of the porous organic body. Therefore, when an attempt is made on producing a porous ceramics body having finer pores, the slurry is filled in the porous organic body to cause clogging. As a result, such an attempt has a disadvantage of difficulty in producing a porous ceramics body having open micropores.

CITATION LIST

Patent Literature

Patent literature No. 1: JP H02-167868 A.
Patent literature No. 2: JP 2004-49355 A.

SUMMARY OF INVENTION

Technical Problem

An object of the invention is to solve the problems as described above and to provide a method for producing a porous calcium phosphate body having open micropores. Moreover, another object of the invention is to provide a method for producing a porous calcium phosphate body having open and uniform micropores.

Solution to Problem

The present inventors have diligently continued to conduct research in order to achieve the object. As a result, the present inventors have found that calcium phosphate is formed into a fibrous form by electrospinning to form a fibrous structure precursor (hereinafter, occasionally referred to as "fiber assembly") to preferably allow production of a porous calcium phosphate body having open micropores, particularly, open and uniform micropores, and thus have completed the invention based on the finding.

The invention has structure as described below.

Item 1. A method for producing a porous calcium phosphate body, wherein calcium phosphate is subjected to electrospinning.

Item 2. The method for producing the porous calcium phosphate body according to item 1, wherein the calcium phosphate to be subjected to electrospinning is hydroxyapatite or tricalcium phosphate.

Item 3. The method for producing the porous calcium phosphate body according to item 1 or 2, wherein the porous calcium phosphate body includes a porous hydroxyapatite body or a porous tricalcium phosphate body.

Item 4. The method for producing the porous calcium phosphate body according to any one of items 1 to 3, using hydroxyapatite in which a full width at half maximum of a peak at a diffraction angle: $2\theta=46.7°$ by X-ray diffractometry is 0.5° or more.

Item 5. The method for producing the porous calcium phosphate body according to any one of items 1 to 4, wherein calcium phosphate is dispersed into a dispersion medium to form a dispersion liquid, the dispersion liquid is subjected to electrospinning, and then spun fibers are calcined.

Item 6. The method for producing the porous calcium phosphate body according to item 5, further dispersing a fiber-formable polymer into the dispersion liquid.

Item 7. The method for producing the porous calcium phosphate body according to item 5 or 6, wherein calcination is performed in a temperature range of 500° C. or higher.

Item 8. The method for producing the porous calcium phosphate body according to item 6 or 7, wherein a ratio of calcium phosphate/fiber-formable polymer (weight ratio) is 0.3 or more.

Item 9. The porous calcium phosphate body, obtained by the method for producing the same according to any one of items 1 to 8.

Advantageous Effects of Invention

The invention allows production of a porous calcium phosphate body having mutually open micropores, particularly, open and uniform micropores.

DESCRIPTION OF EMBODIMENTS

Figure 1:
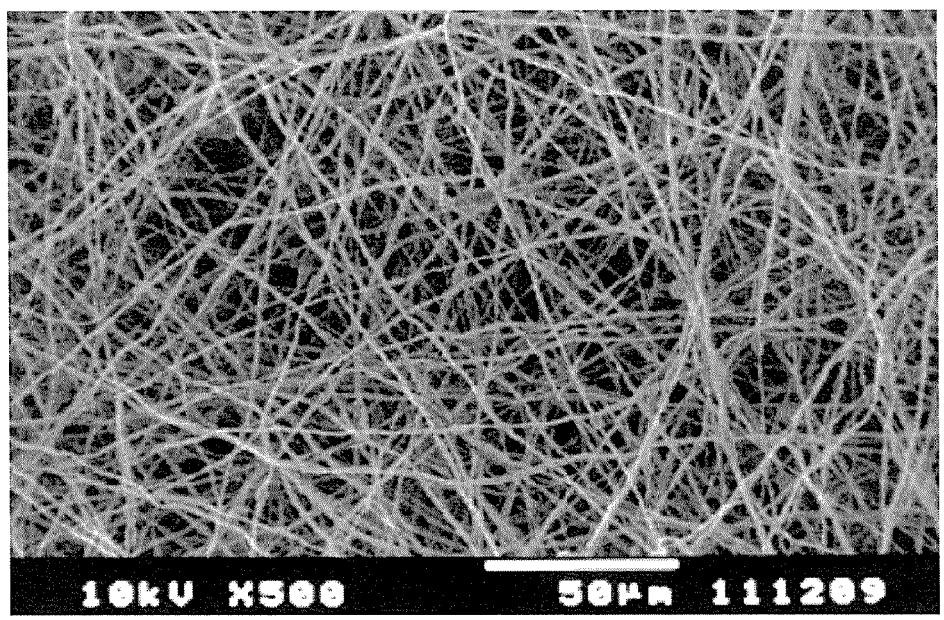
FIG. 1 is a scanning electron micrograph showing a state of uniformity and open properties of pores in a porous hydroxyapatite body.

The invention will be described in detail below according to embodiments of the invention.

Method for Producing Porous Calcium Phosphate Body

A method for producing a porous calcium phosphate body according to the invention is based on a method for electrospinning of calcium phosphate. When the calcium phosphate is hydroxyapatite, the porous calcium phosphate body obtained is referred to as a porous hydroxyapatite body. Moreover, when the calcium phosphate is tricalcium phosphate, the porous calcium phosphate body obtained is referred to as a porous tricalcium phosphate body.

Calcium Phosphate

Specific examples of calcium phosphate to be used in the invention include calcium hydrogen phosphate, tricalcium phosphate and hydroxyapatite. Above all, in view of biocompatibility, tricalcium phosphate or hydroxyapatite is preferred. In addition, tricalcium phosphate herein is used in a meaning including a tricalcium phosphate precursor.

An example of a case where hydroxyapatite is used as calcium phosphate will be described below, but a case where tricalcium phosphate is used as calcium phosphate can also be described in a similar manner. Moreover, the invention is not limited thereto. In the invention, hydroxyapatite to be used for producing the porous hydroxyapatite body (hereinafter, occasionally referred to as "hydroxyapatite to be used for production according to the invention") can be produced by allowing a calcium ion aqueous solution to react with a phosphate ion aqueous solution, for example. Moreover, a commercially available item such as SHAp (calcined hydroxyapatite nanoparticles, made by SofSera Corporation) can also be used.

Hydroxyapatite to be used for production according to the invention may have low crystallinity or high crystallinity. The low crystallinity is preferred in view of aggregation and unification of hydroxyapatite with each other in fibers to allow improvement in strength of the porous hydroxyapatite body. A degree of crystallinity of hydroxyapatite as described above can be measured by X-ray diffractometry, and as a full width at half maximum of a peak showing each crystal plane is wider, the crystallinity becomes lower. Specifically, the full width at half maximum of the peak at a diffraction angle: $2\theta=46.7°$ is preferably 0.5° or more, and further preferably, 0.7° or more. Such low-crystallinity hydroxyapatite can be easily produced by a wet method, for example. In the wet method, for example, a calcium nitrate aqueous solution and an ammonium phosphate aqueous solution are mixed under alkaline conditions, a temperature of a reaction solution is adjusted in the range of 0 to 100° C., pH is adjusted in the range of 7 to 14, and a reaction time is adjusted in the range of 3 to 48 hours to allow control of the crystallinity in a desired range.

When hydroxyapatite to be used in the invention has high crystallinity, strength of the porous hydroxyapatite body decreases, but the specific surface area can be improved because a fine uneven shape is formed on a fiber surface. "Having high crystallinity" in the invention means that the full width at half maximum of the peak at the diffraction angle: $2\theta=46.7°$ is less than 0.5° upon measurement by the X-ray diffractometry. Such high-crystallinity hydroxyapatite can be obtained by calcining low-crystallinity hydroxyapatite prepared by the wet method, for example. In calcination, for example, a calcination temperature is set in the range of 100 to 1,800° C., and calcination time is appropriately set based on hardness of desired ceramics particles, and thus the crystallinity can be controlled in a desired range.

Furthermore, calcination may be performed by adding a fusion preventive agent for the purpose of preventing fusion among hydroxyapatite primary particles. Specific examples of the fusion preventive agent include a calcium-containing inorganic compound such as calcium chloride, calcium oxide, calcium sulfate, calcium nitrate, calcium carbonate, calcium hydroxide, calcium acetate and calcium citrate, a potassium-containing inorganic compound such as potassium chloride, potassium oxide, potassium sulfate, potassium nitrate, potassium carbonate, potassium hydroxide and potassium phosphate, and a sodium-containing inorganic compound such as sodium chloride, sodium oxide, sodium sulfate, sodium nitrate, sodium carbonate, sodium hydroxide and sodium phosphate. An amount of use thereof is preferably 1 g or more and 1,000 g or less, further preferably, 5 g or more and 800 g or less, and most preferably, 10 g or more and 500 g or less, based on 100 g of hydroxyapatite primary particles.

Moreover, in a step for mixing the hydroxyapatite primary particles and the fusion preventive agent, a polymer having any one of a carboxyl group, a sulfonate group, a phosphate group or an amino group in a side chain may be mixed as a fusion preventive aid. As the fusion preventive aid, polyacrylic acid, polymethacrylic acid, polyglutamic acid, polyethylenesulfonic acid, alkyl polymethacrylate-sulfonic acid ester, polyacryloylaminomethylphosphonic acid or polypeptide can be used, and preferably, polyacrylic acid is used. An amount of use thereof is preferably 1 g or more and 1,000 g or less, further preferably, 5 g or more and 800 g or less, and most preferably, 10 g or more and 500 g or less, based on 100 g of hydroxyapatite primary particles.

A shape of hydroxyapatite to be used for production according to the invention is not particularly limited. For example, the shape may have a particle form, a rod form, a fibrous form or an amorphous polycrystalline substance. From a viewpoint of obtaining uniform fibers in which hydroxyapatite is tightly packed in the fibers, particle-form hydroxyapatite is preferred. Furthermore, a particle-form size thereof is preferably less than 200 nanometers, and further preferably, less than 50 nanometers. The size is adjusted in the above range to further increase particle packing density, and hydroxyapatite is easily aggregated and unified in the fibers obtained to improve strength.

Dispersion Medium

Various aspects exist in a spinning solution from which spinning is performed, but hydroxyapatite is preferably dispersed into a dispersion medium to prepare the spinning solution. The dispersion medium to be used is not particularly limited, if hydroxyapatite can be uniformly dispersed thereinto, and specific examples include water, methanol, ethanol, propanol, acetone, N,N-dimethylformamide, N,N-dimethylacetamide, dimethyl sulfoxide, N-methyl-2-pyrrolidone, toluene, xylene, pyridine, formic acid, acetic acid, tetrahydrofuran, dichloromethane, chloroform, 1,1,1,3,3,3-hexafluoroisopropanol and a mixture thereof. Among the media, a polar solvent is preferably used from a viewpoint of dispersibility of hydroxyapatite, and a dispersion liquid is further preferably adjusted by using water, methanol, ethanol, propanol, acetone or N,N-dimethylformamide, for example.

A concentration of hydroxyapatite in the dispersion medium is preferably 30% by weight or less, and further preferably, 15% by weight or less in order to disperse the hydroxyapatite into the medium. When the concentration is 30% by weight or less, hydroxyapatite is hard to aggregate in the dispersion medium and easy to form fiber formation.

Fiber-Formable Polymer

A fiber-formable polymer may be further incorporated into the dispersion liquid containing hydroxyapatite and the dispersion medium for the purpose of improving spinnability. The fiber-formable polymer only needs to produce an effect of promoting fiber formation of hydroxyapatite, and is selected from polymers that can be dissolved into the dispersion medium, and decomposed by calcination. Specific examples of the fiber-formable polymer include polyvinyl alcohol, polyethylene glycol, polyethylene oxide, polyvinylpyrrolidone, polyacrylic acid, sodium polyacrylate, polymethacrylic acid, sodium polymethacrylate, polyacrylamide, polymethacrylamide, polyvinyl acetate, polyethylene, polypropylene, polyethylene terephthalate, polylactic acid, polyamide, polyurethane, polystyrene, polyfluorovinylidene, polyacrylonitrile, polymethylmethacrylate, polyglycolic acid, polycaprolactone, cellulose, a cellulose derivative, chitin, chitosan, collagen, gelatin and a copolymer thereof. The fiber-formable polymer may be used in one kind, and in mixing two or more kinds. A mixing ratio when the polymer is used in mixing two or more kinds is not particularly limited, and can be appropriately set in view of desired spinnability and dispersibility and physical properties of fibers obtained.

In the invention, use of a fiber-formable polymer having a functional group with high coordination properties to hydroxyapatite allows higher dispersion of hydroxyapatite, in addition to improvement in spinnability, and therefore such use is preferred. Specific examples of such a hydroxyapatite-coordinating functional group include an amino group, an alkoxysilyl group, an ether group, a hydroxy group, a carbonyl group, a carboxyl group, a phosphate group and a sulfonyl group, and as such a fiber-formable polymer, polyvinylpyrrolidone, polyethylene glycol, polyethylene oxide, polyvinyl alcohol, polyacrylic acid, polyacrylamide, polyvinyl acetate, polyethylene terephthalate, polylactic acid, polyglycolic acid, polycaprolactone, polymethylmethacrylate, polyurethane, polyamide, cellulose, a cellulose derivative, collagen, gelatin or the like is preferably used.

A weight ratio (calcium phosphate/fiber-formable polymer=hydroxyapatite/fiber-formable polymer) in a mixture of hydroxyapatite and the fiber-formable polymer is preferably 0.3 or more, further preferably, 0.5 or more, and still further preferably, 1.0 or more. When a ratio of hydroxyapatite/fiber-formable polymer (weight ratio) is 0.3 or more, shrinkage of fibers after calcination is small, a fibrous shape can be easily maintained, and uniform pores are easily formed, and therefore such a ratio is preferred. When the ratio is 1.0 or more, shrinkage of fibers during calcination is particularly suppressed, and processing into a desired shape is facilitated, and therefore such a ratio is further preferred.

Surfactant

A surfactant may be further incorporated into the dispersion liquid for the purpose of promoting the dispersibility of hydroxyapatite into the dispersion liquid. The surfactant can be used in the range in which an effect of hydroxyapatite is not adversely affected, and specific examples of the surfactant include a general ionic surfactant such as sodium dodecyl sulfate and tetrabutylammonium bromide and tetrabutylammonium chloride, and a general nonionic surfactant such as polyoxyethylene sorbitan monolaurate. The surfactant preferably contains no metal ion in view of allowing obtaining of a porous hydroxyapatite body with high purity, and from such a viewpoint, specific examples of the surfactant include tetrabutylammonium bromide and tetrabutylammonium chloride, and polyoxyethylene sorbitan monolaurate. Moreover, the surfactant is preferably uniformly dissolved into the dispersion medium.

A concentration of the surfactant is appropriately set depending on a kind of dispersion medium or fiber-formable polymer to be used or the like, and is not particularly limited, but is preferably in the range of 30% by weight or less, and further preferably, in the range of 10% by weight or less, based on hydroxyapatite. When the concentration of the surfactant is 30% by weight or less, an improvement in an effect matching with use is obtained, or an influence on a composition of the porous hydroxyapatite body becomes small, and therefore such a concentration is preferred.

A component other than the component described above may be contained as a component of the dispersion liquid, if the concentration is within the range in which advantageous effects of the invention are not significantly adversely affected.

Method for Preparing Dispersion Liquid

A method for preparing the dispersion liquid of hydroxyapatite is not particularly limited. Specific examples of the method for preparation of the same include stirring and ultrasonication. Furthermore, the dispersion liquid with high uniformity can be obtained by using a disperser such as a beads mill. Moreover, a mixing sequence is not particularly limited, either. Mixing may be carried out simultaneously or sequentially. In order to obtain hydroxyapatite having the fibrous shape, a viscosity of the dispersion liquid is preferably prepared in the range of 10 to 10,000 cP, and further preferably, in the range of 100 to 8,000 cP. When the viscosity is 10 cP or more, spinnability for forming the fibers is obtained, and when the viscosity is 10,000 cP or less, the dispersion liquid is easily discharged. When the viscosity is in the range of 100 to 8,000 cP, good spinnability is obtained in a wide range of spinning conditions, and therefore such a range is further preferred. The viscosity of the dispersion liquid can be adjusted by appropriately changing a concentration of hydroxyapatite or a molecular weight and a concentration of the fiber-formable polymer.

Electrospinning Method

An electrospinning method means a method for discharging a spinning solution, and simultaneously allowing an electric field to act thereon to form the fibers from the discharged spinning solution and to obtain the fibers on a collector. Specific examples include a method for extruding the spinning solution from a nozzle, and simultaneously allowing the electric field to act thereon to perform spinning, a method for bubbling the spinning solution, and simultaneously allowing the electric field to act thereon to perform spinning, and a method for introducing the spinning solution onto a surface of a cylindrical electrode, and simultaneously allowing the electric field to act thereon to perform spinning. According to the method, uniform fibers having a diameter of 10 nanometers to 10 micrometers can be obtained.

The spinning solution is not particularly limited, if the spinning solution has spinnability, and a solution in which a fiber-formable material is dispersed into the dispersion medium, a solution in which the fiber-formable material is dissolved into a solvent, a solution in which the fiber-formable material is melted by heat or irradiation with a laser beam or the like can be used. Hydroxyapatite to be used for production according to the invention is preferably dispersed into the dispersion medium and subjected to electrospinning. As a temperature of the spinning solution, spinning can also be performed at an ordinary temperature, or may be performed by heating and cooling. Specific examples of a method for discharging the spinning solution include a method for discharging, using a pump, the spinning solution filled in a syringe from the nozzle. An inner diameter of the nozzle is not particularly limited, but is preferably in the range of 0.1 to 1.5 millimeters. An amount of discharge is not particularly limited, but is preferably 0.1 to 10 milliliters per hour.

A method for allowing the electric field to act thereon is not particularly limited, if the electric field can be formed for the nozzle and the collector. For example, a high voltage may be applied to the nozzle to ground and the collector. A voltage to be applied thereto is not particularly limited, if the fibers are formed, but is preferably in the range of 5 to 50 kV. Moreover, a distance between the nozzle and the collector is not particularly limited, if the fibers are formed, but is preferably in the range of 5 to 30 centimeters. The collector only needs to allow collection of spun fibers, and a raw material thereof, a shape thereof or the like is not particularly limited. As the raw material of the collector, a conductive material such as a metal is preferably used. The shape of the collector is not particularly limited, but specific examples include a flat plate form, a shaft form and a conveyer form. If the collector has the flat plate form, the fiber assembly can be collected in a sheet form, and if the collector has the shaft form, the fiber assembly can be collected in a tube form. If the collector has the conveyer form, the fiber assembly collected in the sheet form can be continuously produced.

The fiber assembly may be collected in a collection body installed between the nozzle and the collector. The collecting body has a volume resistivity value of, preferably, $10^{10}$ $\Omega \cdot cm$ or less, and further preferably, $10^8$ $\Omega \cdot cm$ or less. Moreover, a collection body made of a raw material having a volume resistivity value exceeding $10^{10}$ $\Omega \cdot cm$ can also be preferably used by simultaneously using a device for dissipating an electric charge, such as an ionizer. Moreover, if a collection body having an arbitrary shape is used, the fiber assembly can be collected according to the shape of the collection body. Furthermore, as the collection body, a liquid such as water and alcohol can also be used.

Calcination Method

The fiber assembly subjected to electrospinning is calcined. Bonding of hydroxyapatite with each other in the fiber assembly can be strengthened and crystallinity can be improved by calcining the fiber assembly. Moreover, when the fiber-formable polymer, the surfactant or the like is contained, such a material can be thermally decomposed to form the porous hydroxyapatite body with high purity. A calcination method is not particularly limited, but can be applied in an air atmosphere. A component residue other than hydroxyapatite, such as the fiber-formable polymer and the surfactant, can be decreased by calcination in air.

The calcination temperature is preferably 500° C. or higher, further preferably, in the range of 600 to 1,500° C., still further preferably, in the range of 800 to 1,300° C., and particularly preferably, 1,000° C. to 1,300° C. When the calcination temperature is 500° C. or higher, calcination becomes sufficient, and bonding of hydroxyapatite with each other is strengthened, and simultaneously the component other than hydroxyapatite becomes hard to remain. Moreover, when the calcination temperature is 1,300° C. or higher, hydroxyapatite is decomposed into tricalcium phosphate or the like, but a porous body having such a composition can also be used as an implant material with high bioabsorbable properties, for example. Specific examples of tricalcium phosphate that may be incorporated into the thus formed porous hydroxyapatite body include α-tricalcium phosphate and β-tricalcium phosphate. For example, when calcination is performed at 1,500° C. for 5 hours, a porous hydroxyapatite body containing β-tricalcium phosphate in an amount of about 30% by weight in the porous body can be obtained, and a content of β-tricalcium phosphate can be arbitrarily changed by changing the calcination temperature or the calcination time. When the calcination temperature is in the range of 800 to 1,300° C., hydroxyapatite with high crystallinity and high purity can be produced. When the calcination temperature is as relatively low as 500 to 600° C., the crystallinity of the resulting porous hydroxyapatite body becomes low, but such fibers can also be preferably used in an application such as a bone filling material and an early stage soluble cell carrier.

The calcination time is not particularly limited, but calcination may be performed for 1 to 24 hours, for example.

A rate of temperature rise is not particularly specified, but calcination can be performed appropriately changing the rate in the range of 5 to 50° C. per minute. In addition, "calcination time" herein means a period of time held at a preset calcination temperature, and includes no temperature rise time before reaching to the calcination temperature. Moreover, in the invention, application of a calcination method in which the preset calcination temperature is changed in a multistage is not precluded, but in the above case, the period of time including a period of time required for changing the calcination temperature is referred to as "calcination time."

Preliminary calcination is preferably completed before calcination for the purpose of suppressing shrinkage or deformation of the porous hydroxyapatite body in a calcination process. A rate of temperature rise during the preliminary calcination is not particularly specified, if the component other than hydroxyapatite slowly disappears at the rate. For example, the rate is preferably 0.1 to 5° C. per minute, and further preferably, 0.5 to 3° C. per minute. The preliminary calcination temperature only needs to be a temperature at which the component other than hydroxyapatite does not remain, and is preferably in the range of 300 to 700° C., and further preferably, in the range of 400 to 650° C., for example. Preliminary calcination time is not particularly specified, if the component other than hydroxyapatite sufficiently disappears during the time, but specific examples include 0 to 24 hours. An expression "the preliminary calcination time is 0 hour" in the above case means direct transition from a temperature rise process in the preliminary calcination to a temperature rise process in calcination. Moreover, in a specific combination of calcination with the preliminary calcination to be performed before calcination, the preliminary calcination temperature is preferably lower by 50° C. or more, and further preferably, by 100° C. or more in comparison with the calcination temperature at which calcination is performed thereafter. Moreover, a preliminary calcination step to be performed before calcination, and a calcination step may be applied continuously or discontinuously, more specifically, with a time interval between both steps, but a method to be applied continuously and in a multistage is preferred. In addition, "preliminary calcination time" herein is defined in a manner substantially identical with the definitions of "calcination time" described above.

The fiber assembly obtained by performing electrospinning is formed into an arbitrary shape and calcined, and thus the porous hydroxyapatite bodies having various shapes can be obtained. For example, the fiber assembly is formed into a two-dimensional sheet form, and calcined, and thus a sheet-formed porous hydroxyapatite body can be obtained, and the fiber assembly is wound around a shaft and collected, and thus a tube-shaped porous hydroxyapatite body can be obtained. Moreover, the fiber assembly is collected in a liquid, freeze-dried and formed into a flocculent form and calcined, and thus a flocculent porous hydroxyapatite body can also be obtained. Strength of the porous hydroxyapatite body is not particularly specified, and as described above, can be appropriately adjusted by the crystallinity, the shape or the size of hydroxyapatite to be used for production according to the invention, the weight ratio of hydroxyapatite/fiber-formable polymer, the calcination conditions, the above formation method or the like.

A content of the component other than hydroxyapatite in the thus obtained porous hydroxyapatite body by calcination is not particularly specified, but from a viewpoint of sufficiently developing characteristics of hydroxyapatite, is generally preferably small in size, and preferably, 50% by weight or less. Meanwhile, from a viewpoint of adding characteristics other than a function of hydroxyapatite, formation of composite with another functional material is also allowed.

In the above case, specific examples of the functional material include β-tricalcium phosphate (β-TCP), and a content thereof is preferably in the range of 10 to 90% by weight. As a method for measuring the content, for example, a sample in which a ratio of β-tricalcium phosphate to hydroxyapatite is known is prepared, and a calibration curve is previously determined by X-ray diffractometry or the like, respectively. Then, based on the calibration curve, the content of β-tricalcium phosphate in hydroxyapatite can be determined from X-ray diffractometry of the porous hydroxyapatite body.

Porous Calcium Phosphate Body

If the present method is applied, the porous calcium phosphate body can be easily produced. The method is particularly preferably applied to production of the porous hydroxyapatite body or the porous tricalcium phosphate body. An example of the porous hydroxyapatite body will be described below, but the porous tricalcium phosphate body can also be described in a similar manner. Moreover, the invention is not limited thereto.

A fiber diameter of hydroxyapatite fibers constituting the thus calcined and obtained porous hydroxyapatite body is not particularly specified, and can be appropriately selected according to the characteristics and a use of the porous hydroxyapatite body to be required. For example, a pore size and mechanical characteristics can be controlled by controlling the fiber diameter. A method for controlling the fiber diameter is not particularly specified, but examples of conditions include a kind of the dispersion medium, a concentration of hydroxyapatite in the dispersion medium, a viscosity of the dispersion liquid and electrospinning conditions, and the fiber diameter can be controlled by appropriately changing the conditions. Moreover, a fiber length of the hydroxyapatite fibers constituting the thus calcined and obtained porous hydroxyapatite body is not particularly specified, but from a viewpoint of obtaining excellent mechanical strength, continuous fibers are preferred.

"Having open and uniform micropores" in the porous calcium phosphate body according to the invention means a state in which calcium phosphate is formed into the fibrous shape by electrospinning to form the fiber assembly, and pores of the thus calcined and obtained porous calcium phosphate body as formed by the fibers are open between any planes of the porous body, for example, upper and lower planes or right and left planes thereof, and a size of the thus formed pores is 500 micrometers or less, further, 200 micrometers or less, and particularly, 50 micrometers or less, and a CV value of the size is 50% or less. In the case of the invention, if a void ratio of the porous body is 30% or more, the pores are presumably open.

The void ratio of the thus calcined and obtained porous hydroxyapatite body is not particularly specified, and can be appropriately selected according to the mechanical characteristics and the use to be required. If the void ratio is increased, mechanical strength tends to decrease. However, for example, in the case where the porous body is used as an artificial bone, a bone prosthetic material or a packing material for chromatography, a comparatively high void ratio is preferred, and from such a viewpoint, the void ratio is preferably in the range of 30 to 95%, further preferably, in the range of 50 to 95%, and still further preferably, in the range of 80 to 95%.

The hydroxyapatite fibers constituting the thus calcined and obtained porous hydroxyapatite body may be arranged at random, or one-dimensionally or two-dimensionally arrayed. When the fibers are arranged at random, the characteristics such as the mechanical strength are isotropically developed, and when the fibers are one-dimensionally or two-dimensionally arrayed, various characteristics are anisotropically developed. Surface properties of the hydroxyapatite fibers constituting the thus calcined and obtained porous hydroxyapatite body are not particularly limited, and may have smooth structure or uneven structure. A case of the smooth structure is preferred in view of aggregation and unification of hydroxyapatite with high density to achieve high mechanical strength, and a case of the uneven structure is preferred in view of further increasing the specific surface area, although the mechanical strength decreases.

The porous calcium phosphate body of the invention has open micropores, particularly, open and uniform micropores, and therefore can be preferably used in various applications. Specific examples of the applications include a cell culture substrate to be used for a petri dish for cell culture, a biomaterial such as an artificial bone for implant and a bone or tooth prosthetic material, a packing material having protein adsorption characteristics for chromatography, a catalyst for synthesizing polymer alcohol, a catalyst carrier, a filter medium, an electronic material, a physiologically active substance-immobilized carrier, and a heavy-metal adsorbent.

More specifically, when the porous calcium phosphate body is used as the cell culture substrate, the porous calcium phosphate body may be used alone, or the porous calcium phosphate body may also be used as a composite material by forming the composite of the porous calcium phosphate body with any other raw material due to a structure and features of the porous calcium phosphate body of the invention, or by utilizing the structure and the features. Specific examples of the composite material include a laminate between a metal plate and the porous calcium phosphate body as obtained by electrospinning the fiber assembly on the metal plate and calcining the resulting laminate. An effect of improvement in handling properties can be expected by using the laminate. Furthermore, the laminate allows cell three-dimensional culture due to structural features of the porous body. A kind of the metal plate is not particularly limited, but in consideration of heat resistance and compatibility with a living body, for example, a titanium plate can be preferably used.

Moreover, when the porous calcium phosphate body is used as the artificial bone for implant, for example, the porous calcium phosphate body can be used as a bulky porous calcium phosphate body by overlapping a plurality of the fiber assemblies obtained by performing electrospinning, and calcining the resulting material, and thus effect of three-dimensionally growing and regenerating tissue cells can be expected.

Moreover, when the porous calcium phosphate body is used as the bone prosthetic material, the porous calcium phosphate body of the invention is obtained by calcining the fiber assembly obtained by performing electrospinning and collecting the fibers in the flocculent form, and therefore has flexibility, and thus can fill a bone defect part without needing cutting the bone according to a shape of the bone defect part, and an effect of reduction of friction between the bone defect parts can be expected.

When the porous calcium phosphate body is used as the packing material having protein adsorption characteristics for chromatography, for example, the fiber assembly obtained by performing electrospinning is calcined in a state in which the assembly is packed into a cylindrical container, and thus a cylindrical porous calcium phosphate body can be produced. An effect of facilitating a work of packing the material into a column or the like can be expected by using the porous body. Moreover, a sheet-form porous calcium phosphate body obtained by calcining a sheet-form fiber assembly obtained by performing electrospinning can be preferably used as a membrane chromatography material. A membrane thickness can be appropriately adjusted by adjusting a thickness of the fiber assembly sheet before calcination or by overlapping a plurality of the thus calcined and obtained sheet-form porous calcium phosphate bodies.

Moreover, a porous granule can be produced by grinding the thus calcined and obtained porous calcium phosphate body. The porous granule can be preferably used as the packing material for column chromatography. A method for grinding the porous calcium phosphate body is not particularly limited, and a general method such as grinding can be employed. A size and a shape of the thus ground and obtained granule are not particularly limited, and can be appropriately adjusted in consideration of uniform packing properties or packing density to the column, a flow rate in the column or the like. The size (diameter) of the granule is preferably in the range of 5 to 500 micrometers, and further preferably, in the range of 10 to 200 micrometers. A chromatography material formed of the thus obtained cylindrical, sheet-form or granule-form porous calcium phosphate body is not compressed or destroyed even during a high flow rate, and productivity in separation or purification can be improved, and therefore such a material is preferred.

When calcium phosphate is used as the catalyst, the porous calcium phosphate body may be used alone or by forming a composite of the porous calcium phosphate body with any other raw material. When the porous calcium phosphate body is used alone, the porous calcium phosphate body can be utilized as a polymer alcohol synthesis catalyst upon synthesizing, for example, 1-butanol, hexanol, octanol or decanol from ethanol. Moreover, when the porous calcium phosphate body is used as the composite material, specific examples of other raw materials include a transition metal such as ruthenium, palladium, vanadium, silver and titanium, and the transition metal is carried on a surface of the porous calcium phosphate body by cation exchange, adsorption or the like, and thus the resulting material can be utilized as an oxidation reaction catalyst, a photocatalyst or the like for alcohol, amine, silane or the like.

When the porous calcium phosphate body is used as an immobilized carrier for a physiologically active substance or a biological substance, or a microorganism or a substance derived from the microorganism, the porous calcium phosphate body may be used alone, or the porous calcium phosphate body may also be used as a composite material by forming the composite of the porous calcium phosphate body with any other raw material due to the structure and features of the porous calcium phosphate body of the invention, or by utilizing the structure and the features. Specific examples of the physiologically active substance to be immobilized to the carrier include an enzyme, and when the porous body is applied to a recoverable enzyme-immobilized catalyst, reduction of a decrease in catalytic activity as associated with a structural change of the enzyme as is observed in an ordinary enzyme-immobilized catalyst can be expected.

Furthermore, when the porous calcium phosphate body is used as the immobilized carrier for the biological substance, nonspecific adsorption properties of the porous calcium phosphate body are utilized, and thus the porous calcium phosphate body can be utilized as a diagnostic carrier (solid phase) to be used for immunoassay for a clinical diagnostic agent. When a target substance (for example, virus) in a specimen is captured into the solid phase in the immunoassay, an antiviral specific antibody has been spot-applied on a solid phase side to capture the virus so far. However, when the porous calcium phosphate body is used in the solid phase, the porous body can be utilized as a carrier (solid phase) that nonspecifically captures a plurality of target substances and has high versatility. When the target substance is nucleic acid (DNA, RNA), the target substance can also be captured in a similar manner.

Moreover, B/F separation in washing during a reaction can also be easily carried out by producing a porous body by adding an iron or magnetic component during producing the porous body. In a similar manner, when the porous body is used as the immobilized carrier for the microorganism or the substance derived from the microorganism, the porous calcium phosphate body is also effective in adsorption removal of endotoxin, mycoplasm or the like removal of which is required from water for medical care or water used for culture.

In addition, in the explanation of applications described above, a use embodiment in each application is not intended to be limited to a specific embodiment, and use in any other embodiment is not precluded.

EXAMPLES

The invention will be described below in detail by way of Examples, but the invention is not limited by the Examples. In addition, a method for measuring physical properties or a definition presented in the Examples will be described below.

Full Width at Half Maximum of Peak at Diffraction Angle: $2\theta=46.7°$ by X-Ray Diffractometry A full width at half maximum of a peak at a diffraction angle: $2\theta=46.7°$ was determined in a diffraction diagram obtained by X-ray diffractometry by using an X-ray diffractometer (D8 DISCOVER) made by BRUKER Corporation.

Observation of Pores in Porous Hydroxyapatite Body

A photograph was taken at a magnification of 500 using a scanning electron microscope (JSM-5410LV, made by JEOL Co., Ltd.), and uniformity and continuity of pores were confirmed.

Observation of Fiber Structure in Porous Hydroxyapatite Body

A photograph was taken at a magnification of 5,000 using a scanning electron microscope (JSM-5410LV, made by JEOL Co., Ltd.), and a surface appearance of fibers and aggregation properties of hydroxyapatite inside the fibers were confirmed.

Method for Measuring Mean Particle Diameter of Primary Particles

In an image picked up at a magnification of 40,000 using a scanning electron microscope (JSM-6301F, made by JEOL Co., Ltd.), measurement was carried out by measuring diameters of 50 or more primary particles and calculating a mean value thereof.

Example 1

Synthesis of Hydroxyapatite

Low-crystallinity hydroxyapatite particles were prepared by a wet method described below. In addition, as $Ca(NO_3)_2 \cdot 4H_2O$ and $(NH_4)_2HPO_4$, calcium nitrate tetrahydrate and diammonium hydrogen phosphate made by Nacalai Tesque, Inc. were used, as a 25 wt % aqueous ammonia, a 25 wt % aqueous ammonia made by Wako Pure Chemical Industries, Ltd. was used, and as pure water, Milli-Q water was used. First, a $Ca(NO_3)_2$ aqueous solution (42 mN, 80 mL) which was adjusted to pH 12 by the 25 wt % aqueous ammonia was poured into a 1 L flask connected with a cooling tube and a half-moon stirring blade, and maintained at room temperature (30° C.) To the flask, a $(NH_4)_2HPO_4$ aqueous solution (10 mN, 200 mL) of which was adjusted to pH 12 by an ammonia solution was added at room temperature, and the resulting mixture was allowed to react for 10 hours. Next, the resulting reactant was separated by centrifugation and washed to obtain low-crystallinity hydroxyapatite particles. Hydroxyapatite obtained had a spherical shape, a mean particle diameter of primary particles was 20 nanometers, and a full width at half maximum of a peak at a diffraction angle: $2\theta=46.7°$ by X-ray diffractometry was 0.51°.

Preparation of Fibers

Figure 2:
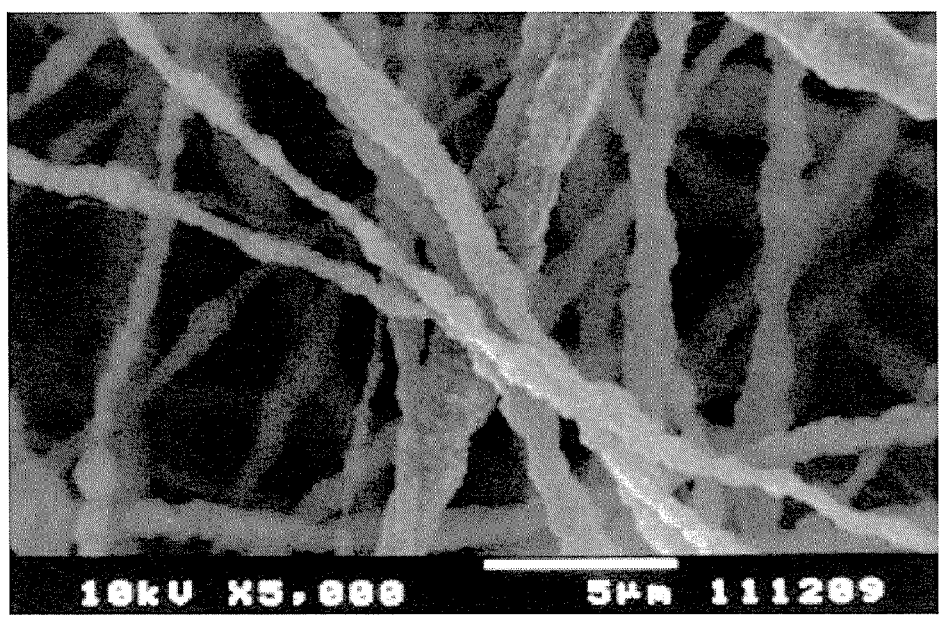
FIG. 2 is a scanning electron micrograph showing a state of aggregation and unification of hydroxyapatite fine particles in a porous hydroxyapatite body.
Figure 6:
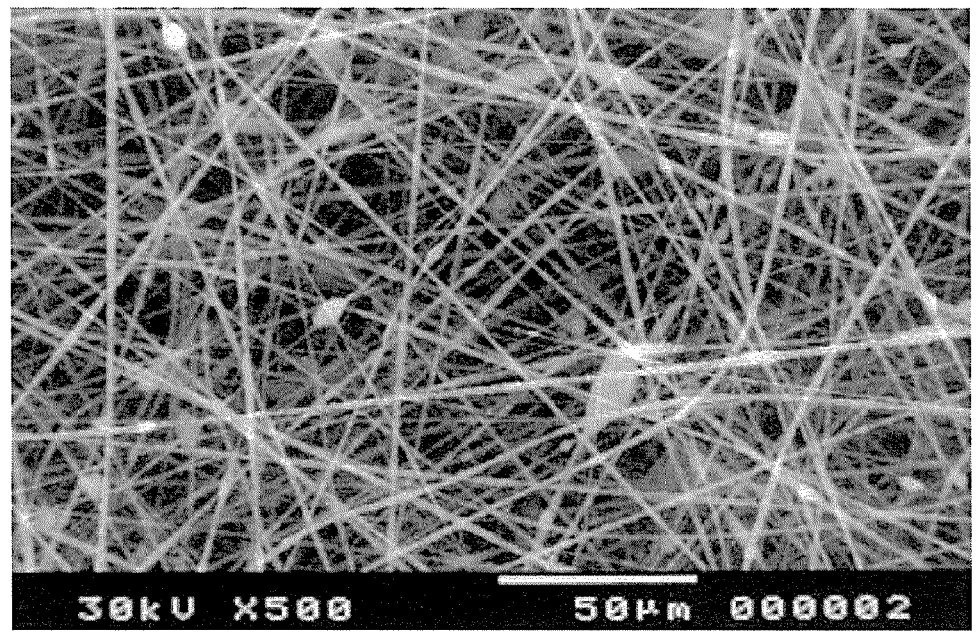
FIG. 6 is a scanning electron micrograph showing a state of uniformity and open properties of pores in a fibrous structure precursor.

A dispersion liquid composed of 64.2 parts by weight of hydroxyapatite ethanol dispersion liquid (13% by weight) prepared by the above method, 8.3 parts by weight of polyvinylpyrrolidone (Mw: 1,300,000, made by Sigma-Aldrich Corporation) and 27.5 parts by weight of ethanol (extra pure; made by Nacalai Tesque, Inc.) was prepared. In the resulting dispersion liquid, a concentration of hydroxyapatite based on ethanol was 9.1% by weight, and a ratio of hydroxyapatite/polyvinylpyrrolidone (weight ratio) was 1.0. Then, the dispersion liquid was fed to a nozzle having an inner diameter of 0.22 millimeter at a rate of 1.0 milliliter per hour using a syringe pump, and simultaneously a voltage of 20 kV was applied to the nozzle, and a fibrous structure precursor (fiber assembly) was collected on a collector grounded. A distance between a needle and the collector was adjusted to 20 centimeters. The fiber assembly subjected to electrospinning was heated to 900° C. at a temperature rise rate of 10° C. per minute in air, held for 1 hour, and then cooled to room temperature to prepare a porous hydroxyapatite body having a mean fiber diameter of 1 micrometer. Scanning electron micrographs of the resulting porous hydroxyapatite bodies are shown in FIGS. 1 and 2. As is clear from FIG. 1, the porous hydroxyapatite body had open and uniform micropores. Moreover, from FIG. 2, in the resulting porous hydroxyapatite body, hydroxyapatite fine particles were confirmed to be aggregated and unified to produce fibers having high surface smoothness. A scanning electron micrograph before calcination is shown as FIG. 6.

Example 2

Preparation of Hydroxyapatite

The low-crystallinity hydroxyapatite particles obtained as described above were calcined by a method described below to prepare high-crystallinity hydroxyapatite nanoparticles. First, into 100 mL of aqueous solution having pH of 7.0 (hereinafter, aqueous solution A) containing 0.5 g of polyacrylic acid (weight average molecular weight: 15,000 g/mol, made by Sigma-Aldrich Corporation) as a fusion preventive aid, 0.5 g of low-crystallinity hydroxyapatite nanoparticles described above were dispersed to adsorb polyacrylic acid on surfaces of the particles. Next, to the dispersion liquid prepared as described above, 500 mL of calcium hydroxide [$Ca(OH)_2$]-saturated aqueous solution was added as a fusion preventive agent to precipitate calcium polyacrylate on the surfaces of the particles. The resulting deposits were collected and dried at 80° C. under reduced pressure to collect mixed particles. The mixed particles were put into a crucible and calcined at a calcination temperature of 800° C. for 1 hour. On the above occasion, calcium polyacrylate was thermally decomposed to calcium oxide (CaO). Next, into 500 mL of aqueous solution A prepared as described above, the resulting calcined body was suspended, the resulting suspension was separated by centrifugation and washed, the resulting material was further suspended into distilled water, and the resulting suspension was separated by centrifugation and washed in a similar manner to remove the fusion preventive agent and the fusion preventive aid and to collect high-crystallinity hydroxyapatite nanoparticles. The resulting hydroxyapatite had a spherical shape, a mean particle diameter of primary particles was 40 nanometers, and a full width at half maximum of a peak at a diffraction angle: 2θ=46.7° by X-ray diffractometry was 0.29°.

Preparation of Fibers

Figure 3:
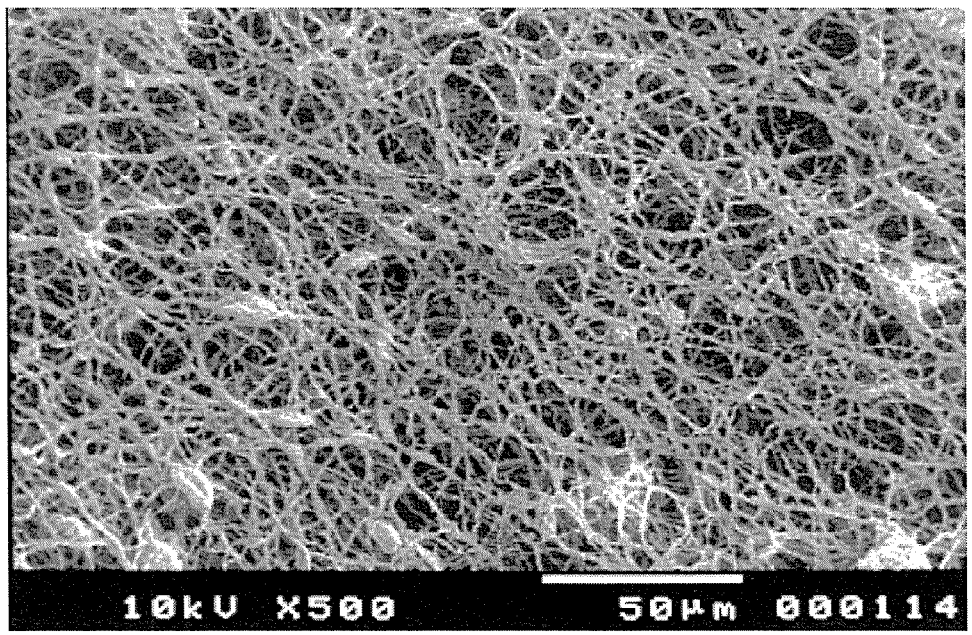
FIG. 3 is a scanning electron micrograph showing a state of uniformity and open properties of pores in a porous hydroxyapatite body.
Figure 4:
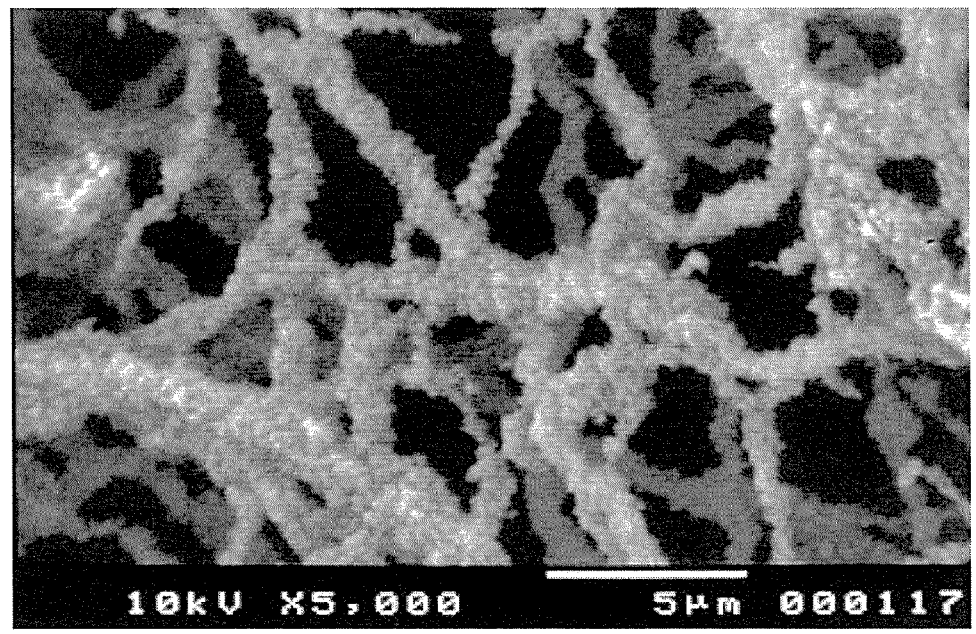
FIG. 4 is a scanning electron micrograph showing a state of aggregation and unification of hydroxyapatite fine particles in a porous hydroxyapatite body.

A porous hydroxyapatite body having a mean fiber diameter of 1.2 micrometers was prepared in a manner similar to Example 1 by using hydroxyapatite prepared by the above method. Scanning electron micrographs of the resulting porous hydroxyapatite bodies are shown in FIGS. 3 and 4. As is clear from FIG. 3, the porous hydroxyapatite body had open and uniform micropores. Moreover, from FIG. 4, crystallinity of hydroxyapatite constituting the fibers was higher and particles thereof were larger in comparison with the fibers in Example 1, and therefore the hydroxyapatite particles were insufficiently aggregated and unified, and fine unevenness derived from individual fine particles was observed on a surface of the fibers. In view of such a shape, the fibers were estimated to have a higher specific surface area, but lower strength and further brittleness in comparison with Example 1.

Example 3

Figure 5:
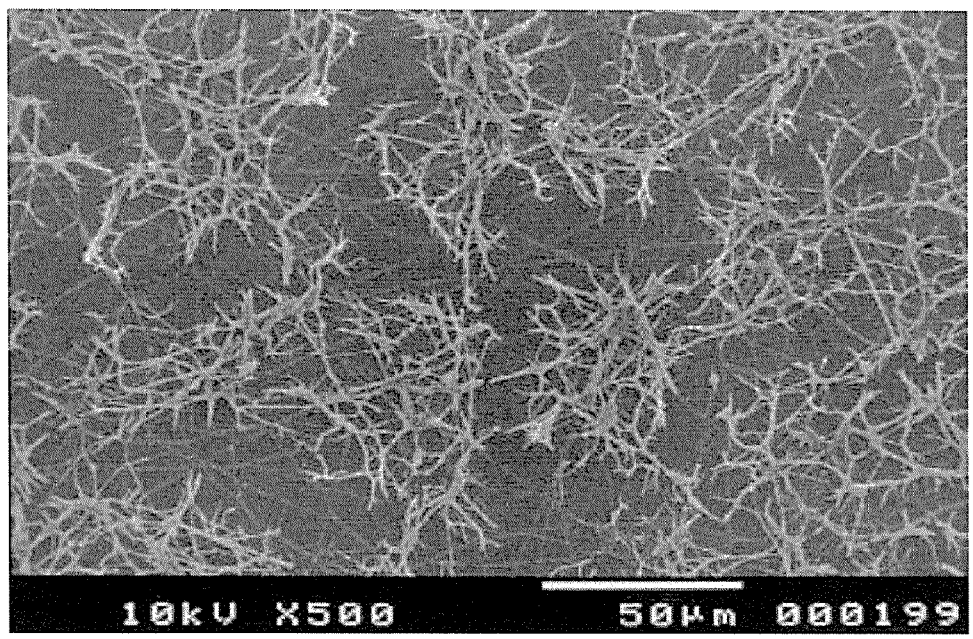
FIG. 5 is a scanning electron micrograph showing a state of uniformity and open properties of pores in a porous hydroxyapatite body.

A dispersion liquid composed of 6.9 parts by weight of hydroxyapatite ethanol dispersion liquid (13% by weight) in Example 1, 9.0 parts by weight of polyvinylpyrrolidone (Mw: 1,300,000, made by Sigma-Aldrich Corporation) and 84.1 parts by weight of ethanol (extra pure; made by Nacalai Tesque, Inc.) was prepared. In the resulting dispersion liquid, a concentration of hydroxyapatite based on ethanol was 1.0% by weight, and a ratio of hydroxyapatite/polyvinylpyrrolidone (weight ratio) was 0.1. Then, a porous hydroxyapatite body was prepared in a manner similar to Example 1. A scanning electron micrograph of the resulting porous hydroxyapatite body is shown in FIG. 5. As shown in FIG. 5, pores were confirmed to be open. However, fibers were observed to be shrunk and have a disconnected part, more specifically, a part having a pore size exceeding 50 micrometers, and thus lacked in pore uniformity.

Example 4

Figure 7:
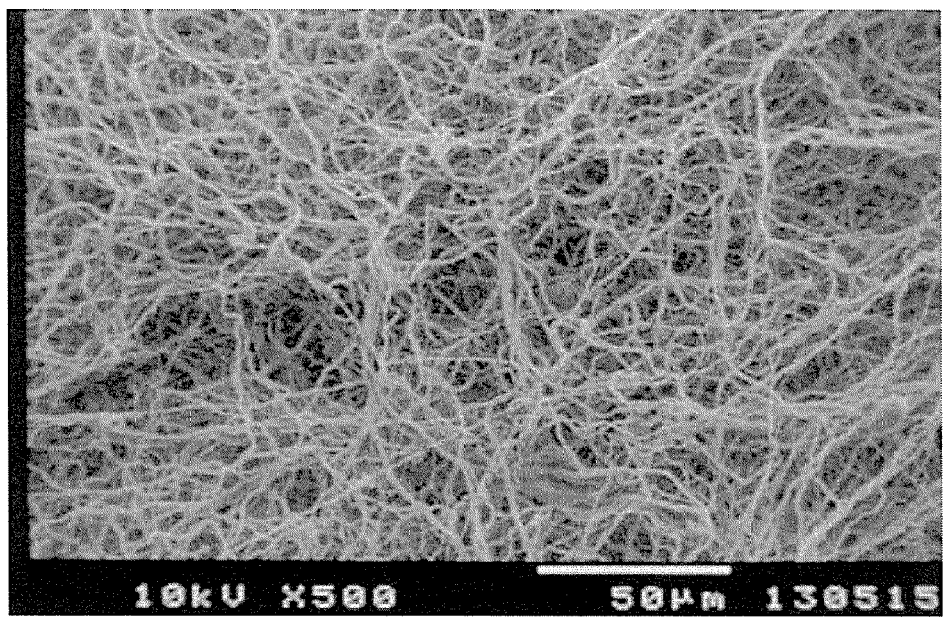
FIG. 7 is a scanning electron micrograph showing a state of uniformity and open properties of pores in a porous hydroxyapatite body.
Figure 8:
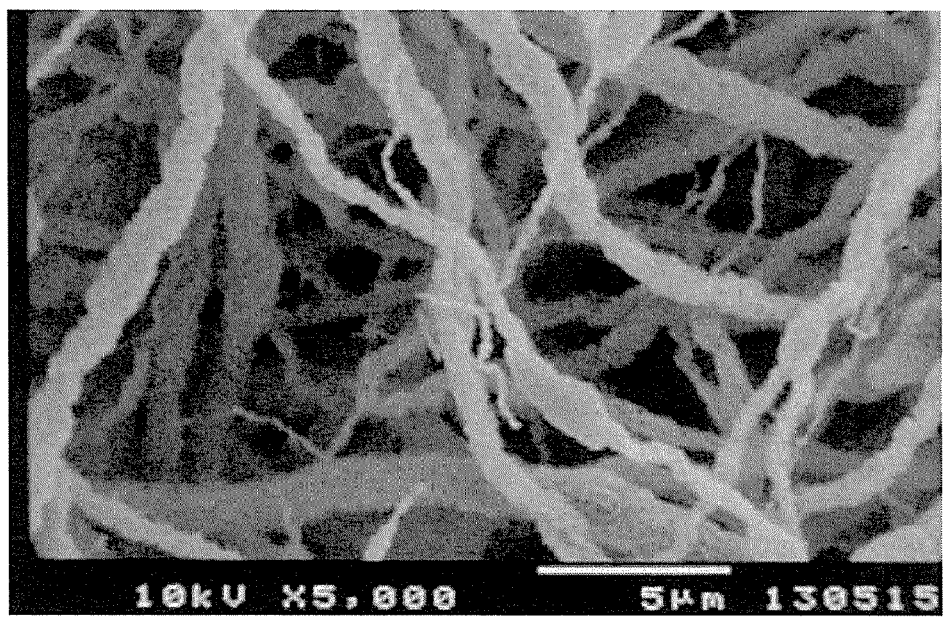
FIG. 8 is a scanning electron micrograph showing a state of aggregation and unification of hydroxyapatite fine particles in a porous hydroxyapatite body.

A dispersion liquid composed of 45.6 parts by weight of hydroxyapatite ethanol dispersion liquid (13% by weight) in Example 1, 8.5 parts by weight of polyvinylpyrrolidone (Mw: 1,300,000, made by Sigma-Aldrich Corporation) and 45.9 parts by weight of ethanol (extra pure; made by Nacalai Tesque, Inc.) was prepared. In the resulting dispersion liquid, a concentration of hydroxyapatite based on ethanol was 6.5% by weight, and a ratio of hydroxyapatite/polyvinylpyrrolidone (weight ratio) was 0.7. Then, a porous hydroxyapatite body was prepared in a manner similar to Example 1. Scanning electron micrographs of the resulting hydroxyapatite are shown in FIGS. 7 and 8. As is clear from FIG. 7, the porous hydroxyapatite body had open and uniform micropores. Moreover, from FIG. 8, in the resulting porous hydroxyapatite body, hydroxyapatite fine particles were configured to be aggregated and unified to produce fibers having high surface smoothness. However, although the porous body had a level enough to use, shrinkage of the porous body before and after calcination was larger in comparison with Example 1.

Example 5

Figure 9:
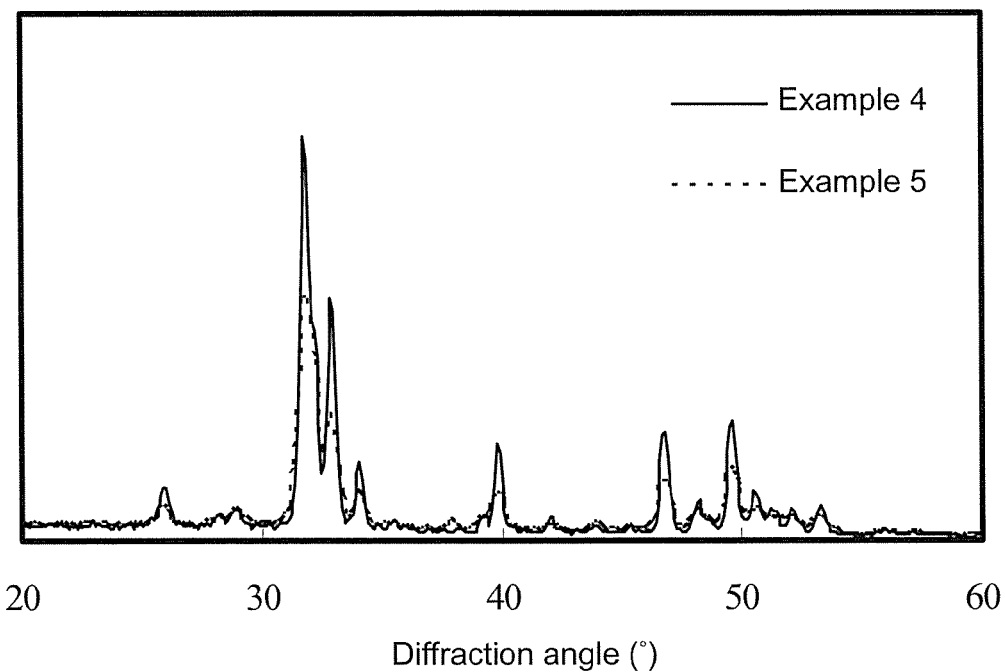
FIG. 9 shows a diffraction diagram obtained by X-ray diffractometry of a porous hydroxyapatite body.

A porous hydroxyapatite body was prepared in a manner similar to Example 4 except that a calcination temperature was adjusted to 600° C. Diffraction diagrams obtained by X-ray diffractometry of the porous hydroxyapatite bodies obtained in Example 4 and Example 5 are shown in FIG. 9. From FIG. 9, the porous hydroxyapatite body obtained in Example 5 was confirmed to be a little lower in crystallinity in comparison with the porous hydroxyapatite body obtained in Example 4.

Example 6

Figure 10:
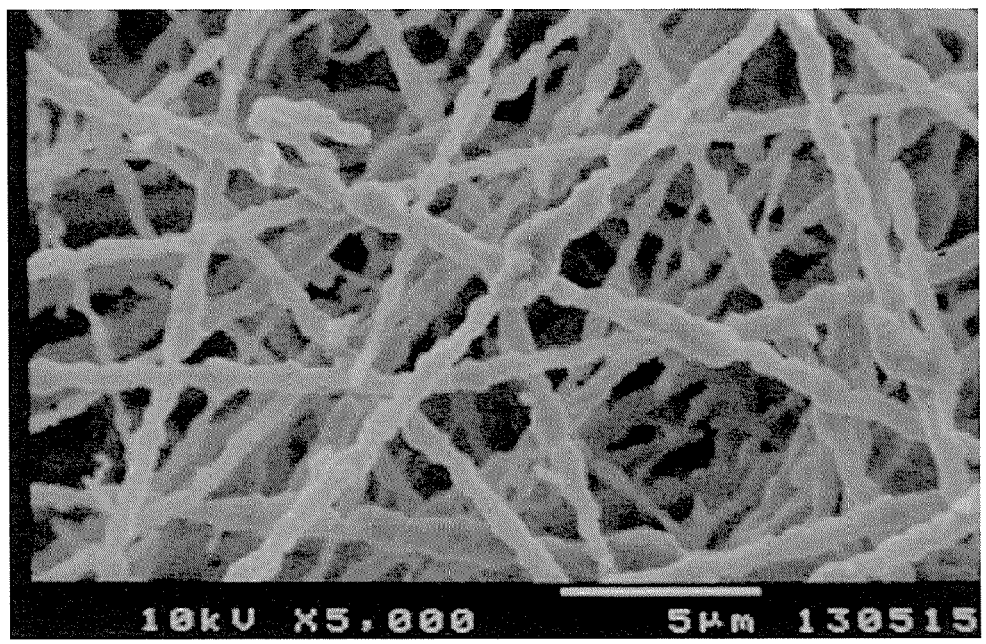
FIG. 10 is a scanning electron micrograph showing a state of aggregation and unification of hydroxyapatite fine particles in a porous hydroxyapatite body.

A porous hydroxyapatite body was prepared in a manner similar to Example 4 except that a calcination temperature was adjusted to 1,150° C. A scanning electron micrograph of the resulting hydroxyapatite is shown in FIG. 10. From FIG. 10, an aspect was confirmed in which hydroxyapatite fine particles were further strongly aggregated and unified in comparison with Example 4.

Example 7

Figure 11:
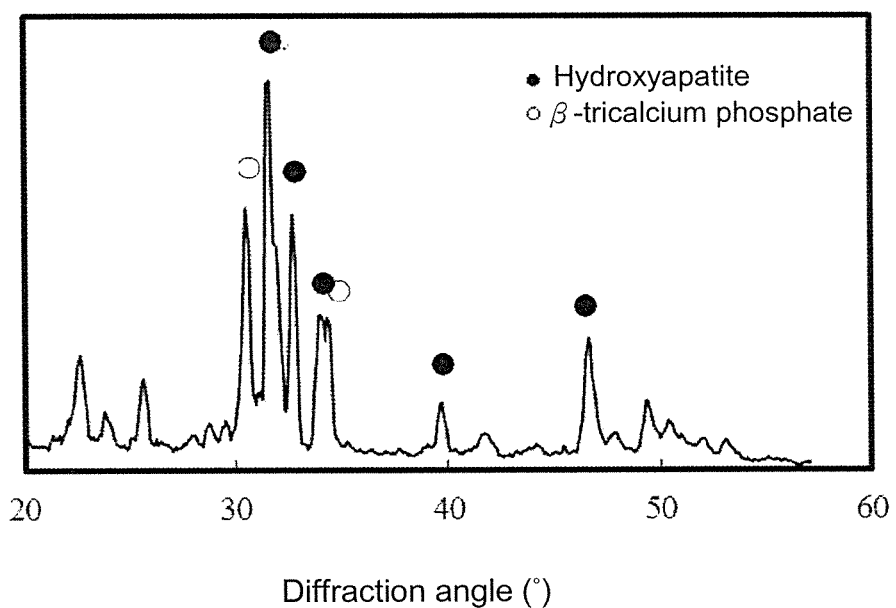
FIG. 11 shows a diffraction diagram obtained by X-ray diffractometry of a porous hydroxyapatite body.

A porous hydroxyapatite body was prepared in a manner similar to Example 4 except that calcination was held at 1,500° C. for 5 hours. A diffraction diagram obtained by X-ray diffractometry of the resulting porous hydroxyapatite body is shown in FIG. 11. From FIG. 11, the resulting porous hydroxyapatite body was confirmed to contain β-tricalcium phosphate. As a result of determining a content (β-TCP/(β-TCP+HAp)×100(%)) of β-tricalcium phosphate (β-TCP) in a mixture of β-tricalcium phosphate and hydroxyapatite (HAp) based on a calibration curve described in paragraphs [0090] to [0094] of JP 4265946 B, the content was 28.6%.

Description of Calibration Curve by Patent Gazette Described Above

A calibration curve for deriving a content of β-tricalcium phosphate contained in plate-like calcium phosphate is determined as described below according to an X-ray analysis method (XRD) using commercially available β-tricalcium phosphate (No. 21218, made by Fluka GmbH) and commercially available hydroxyapatite (APACERAM: registered trademark, made by PENTAX Corp.). A reagent mixture was prepared by mixing the commercially available β-tricalcium phosphate (β-TCP) and the commercially available hydroxyapatite (HAp) as described above to satisfy a predetermined value in an abundance ratio x of β-tricalcium phosphate in the reagent mixture represented by formula (1) below:

$$x(\%) = \beta\text{-TCP}/(\beta\text{-TCP}+\text{HAp}) \times 100 \qquad (1)$$

From a result of X ray analysis on the reagent mixture, an intensity ratio y of β-tricalcium phosphate in the reagent mixture was calculated. Table 1 shows the results. In addition, the above intensity ratio y indicates a value obtained by dividing intensity of (211) (2θ=31.92° of hydroxyapatite by intensity of (0210) (2θ=31.16° of β-tricalcium phosphate as obtained from the results of the X-ray analysis.

TABLE 1

| | x (%) | | | |
|---|---|---|---|---|
| | 20 | 40 | 60 | 80 |
| y | 2.748 | 0.7263 | 0.2640 | 0.1556 |

A calibration curve of formula (2) below was determined based on the abundance ratio x of β-tricalcium phosphate and the intensity ratio y of β-tricalcium phosphate shown in Table 1 above:

$$\log 10y = -0.02093x + 0.7736 \quad (2)$$

(0≤x≤100)

In Hypothetical Example below (Example 8), one of preferred examples of the invention will be described by describing preparation of fibers when tricalcium phosphate was used. Example 8 can be easily specified by a method mutually related with Examples 1 to 7 described above.

Example 8 (Hypothetical Example)

Synthesis of Tricalcium Phosphate

Tricalcium phosphate was prepared by a slurry method presented below.

As phosphate and calcium salt, 5.04 g of calcium bis(dihydrogen phosphate), 2.0 g pf calcium carbonate and 7.36 g of tetracalcium phosphate monoxide were sufficiently finely ground and mixed using a mortar, and the resulting mixture was taken as mixture 1 (mixing step). In mixture 1 prepared at the ratio described above, Ca/P being a mole ratio of a calcium atom to a phosphorus atom became 1.5. To mixture 1, 15 mL of sodium dihydrogenphosphate aqueous solution (0.15 M) as a reaction promoter was added, and quickly stirred, and the resulting mixture was taken as mixture 2 (mixing step), and then filled into a vessel for formation. Mixture 2 was subjected to drying treatment for 1 hour, and ground using a mortar to obtain a β-tricalcium phosphate precursor. The resulting β-tricalcium phosphate precursor was calcined at a calcination temperature of 800° C. for 1 hour to obtain tricalcium phosphate particles.

Preparation of Fibers

A dispersion liquid composed of 64.2 parts by weight of tricalcium phosphate ethanol dispersion liquid (13% by weight) prepared by the above method, 8.3 parts by weight of polyvinylpyrrolidone (Mw: 1,300,000, made by Sigma-Aldrich Corporation) and 27.5 parts by weight of ethanol (extra pure; made by Nacalai Tesque, Inc.) was prepared. In the resulting dispersion liquid, a concentration of tricalcium phosphate based on ethanol was 9.1% by weight, and a ratio of tricalcium phosphate/polyvinylpyrrolidone (weight ratio) was 1.0. Then, the dispersion liquid was fed to a nozzle having an inner diameter of 0.22 millimeter at 1.0 milliliter per hour using a syringe pump, and a voltage of 20 kV was applied to the nozzle to collect a fibrous structure precursor (fiber assembly) on a collector grounded. A distance between a needle and the collector was adjusted to 20 centimeters. The fiber assembly subjected to electrospinning was heated to 900° C. at a temperature rise rate of 10° C. per minute in air, held for 1 hour, and then cooled to room temperature to obtain a porous tricalcium phosphate body composed of ultrafine fibers.

INDUSTRIAL APPLICABILITY

A porous calcium phosphate body of the invention has open micropores, particularly, open and uniform micropores, and therefore can be preferably used in various applications. Specific examples include a cell culture substrate to be used for a petri dish for cell culture, a biomaterial such as an artificial bone for implant and a bone prosthetic material, a packing material having protein adsorption characteristics for chromatography, a catalyst for synthesizing polymer alcohol, a catalyst carrier, a filter medium, an electronic material, a physiologically active substance-immobilized carrier and a heavy-metal adsorbent.

What is claimed is:

1. A method for producing a porous calcium phosphate body, wherein calcium phosphate is dispersed into a dispersion medium to form a dispersion liquid, the dispersion liquid is subjected to electrospinning, and wherein a viscosity of the dispersion liquid is in the range of 100 cP to 8,000 cP, and a surfactant is further incorporated into the dispersion liquid at a concentration of 10% by weight or less based on the calcium phosphate, and the shape of the calcium phosphate have a particle form, and the particle form size is less than 50 nanometers.

2. The method for producing the porous calcium phosphate body according to claim 1, wherein the calcium phosphate to be subjected to electrospinning is hydroxyapatite or tricalcium phosphate.

3. The method for producing the porous calcium phosphate body according to claim 1, wherein the porous calcium phosphate body includes a porous hydroxyapatite body or a porous tricalcium phosphate body.

4. The method for producing the porous calcium phosphate body according to claim 1, using hydroxyapatite in which a full width at half maximum of a peak at a diffraction angle: 2θ=46.7° by X-ray diffractometry is 0.5° or more.

5. The method for producing the porous calcium phosphate body according to claim 1, wherein the dispersion liquid is subjected to electrospinning, and then spun fibers are calcined.

6. The method for producing the porous calcium phosphate body according to claim 5, further dispersing a fiber-formable polymer into the dispersion liquid.

7. The method for producing the porous calcium phosphate body according to claim 5, wherein calcination is performed in a temperature range of 500° C. or higher.

8. The method for producing the porous calcium phosphate body according to claim 6, wherein a ratio of calcium phosphate/fiber-formable polymer (weight ratio) is 0.3 or more.

9. The method for producing the porous calcium phosphate body according to claim 2, wherein the porous calcium phosphate body includes a porous hydroxyapatite body or a porous tricalcium phosphate body.

10. The method for producing the porous calcium phosphate body according to claim 2, using hydroxyapatite in which a full width at half maximum of a peak at a diffraction angle: 2θ=46.7° by X-ray diffractometry is 0.5° or more.

11. The method for producing the porous calcium phosphate body according to claim 3, using hydroxyapatite in which a full width at half maximum of a peak at a diffraction angle: 2θ=46.7° by X-ray diffractometry is 0.5° or more.

12. The method for producing the porous calcium phosphate body according to claim 9, using hydroxyapatite in which a full width at half maximum of a peak at a diffraction angle: 2θ=46.7° by X-ray diffractometry is 0.5° or more.

13. The method for producing the porous calcium phosphate body according to claim 2, wherein the dispersion liquid is subjected to electrospinning, and then spun fibers are calcined.

14. The method for producing the porous calcium phosphate body according to claim 3, wherein the dispersion liquid is subjected to electrospinning, and then spun fibers are calcined.

15. The method for producing the porous calcium phosphate body according to claim 4, wherein the dispersion liquid is subjected to electrospinning, and then spun fibers are calcined.

16. The method for producing the porous calcium phosphate body according to claim 9, wherein the dispersion liquid is subjected to electrospinning, and then spun fibers are calcined.

17. The method for producing the porous calcium phosphate body according to claim 10, wherein the dispersion liquid is subjected to electrospinning, and then spun fibers are calcined.

18. The method for producing the porous calcium phosphate body according to claim 11, wherein the dispersion liquid is subjected to electrospinning, and then spun fibers are calcined.

19. The method for producing the porous calcium phosphate body according to claim 12, wherein the dispersion liquid is subjected to electrospinning, and then spun fibers are calcined.

* * * * *